(12) United States Patent
Mao et al.

(10) Patent No.: US 6,816,317 B2
(45) Date of Patent: Nov. 9, 2004

(54) COLLIMATOR FOR READY FITTING TO AN OPTICAL DEVICE WITH PRECISE OPTICAL ALIGNMENT WITHOUT NEED FOR ADJUSTING POSITIONS OR ANGLES TO COMPENSATE FOR OFFSETS OR DEVIATIONS DURING OPTICAL DEVICE ASSEMBLY AND METHOD OF MAKING SAME

(75) Inventors: Zhongming Mao, Kent, WA (US); Pai-Sheng Shen, Bellevue, WA (US)

(73) Assignee: Lightel Technologies Inc., Kent, WA (US)

( * ) Notice: Subject to any disclaimer, the term of this patent is extended or adjusted under 35 U.S.C. 154(b) by 330 days.

(21) Appl. No.: 10/061,736

(22) Filed: Jan. 31, 2002

(65) Prior Publication Data

US 2003/0142907 A1 Jul. 31, 2003

(51) Int. Cl.[7] .............................. G02B 27/12; G02B 6/32
(52) U.S. Cl. ............................. 359/640; 385/33; 385/52
(58) Field of Search ......................... 359/640, 652–654, 359/819, 822; 385/33–35, 52, 76–85, 93

(56) References Cited

U.S. PATENT DOCUMENTS

| | | | | |
|---|---|---|---|---|
| 3,990,796 A | 11/1976 | Foltz, Jr. | ..................... | 356/152 |
| 4,660,966 A | 4/1987 | Kato et al. | ..................... | 355/43 |
| 4,734,988 A | 4/1988 | Steele et al. | ................... | 33/645 |
| 5,400,133 A | 3/1995 | Hinton et al. | ................ | 356/138 |
| 5,446,815 A | 8/1995 | Ota et al. | ..................... | 385/33 |
| 5,500,911 A | * 3/1996 | Roff | ............................. | 385/33 |
| 5,659,645 A | 8/1997 | Satake | .......................... | 385/33 |
| 5,732,172 A | * 3/1998 | Vann | ............................. | 385/37 |
| 5,774,607 A | * 6/1998 | Shiraishi et al. | .............. | 385/33 |
| 5,841,591 A | 11/1998 | Zhu et al. | .................... | 359/819 |
| 5,937,123 A | * 8/1999 | Frelier | ......................... | 385/79 |
| 6,056,437 A | 5/2000 | Toth | .......................... | 378/205 |
| 6,168,319 B1 | 1/2001 | Francis | ......................... | 385/79 |
| 6,179,483 B1 | * 1/2001 | Kanazawa | .................... | 385/93 |
| 6,215,853 B1 | 4/2001 | Kump et al. | ................. | 378/151 |
| 6,400,867 B1 | * 6/2002 | Liu | ............................... | 385/33 |
| 6,404,954 B1 | * 6/2002 | Zhu et al. | ..................... | 385/34 |
| 6,512,868 B1 | * 1/2003 | Foster et al. | .................. | 385/33 |

* cited by examiner

Primary Examiner—Ricky Mack
(74) Attorney, Agent, or Firm—Law Offices of David Pai; C. David Pai

(57) ABSTRACT

An optical collimator is provided for ready fitting to an optical device with precise optical alignment, to obviate the need for adjusting the collimator during assembly to the optical device to compensate for a translational offset and an angular deviation. In an embodiment, the collimator has a sleeve with an outer cylindrical surface that is concentric with the output optical path, which has a translational offset and an angular deviation with respect to the collimator axis. A method is provided for making such a collimator for ready fitting to an optical device with precise optical alignment. In an embodiment, a portion of an outer sleeve of the collimator is removed according to the offset and the deviation to form an outer cylindrical surface that is centered about an axis which coincides with the optical path emanating from the collimator, to allow the collimator to be readily fitted to an optical device.

46 Claims, 16 Drawing Sheets

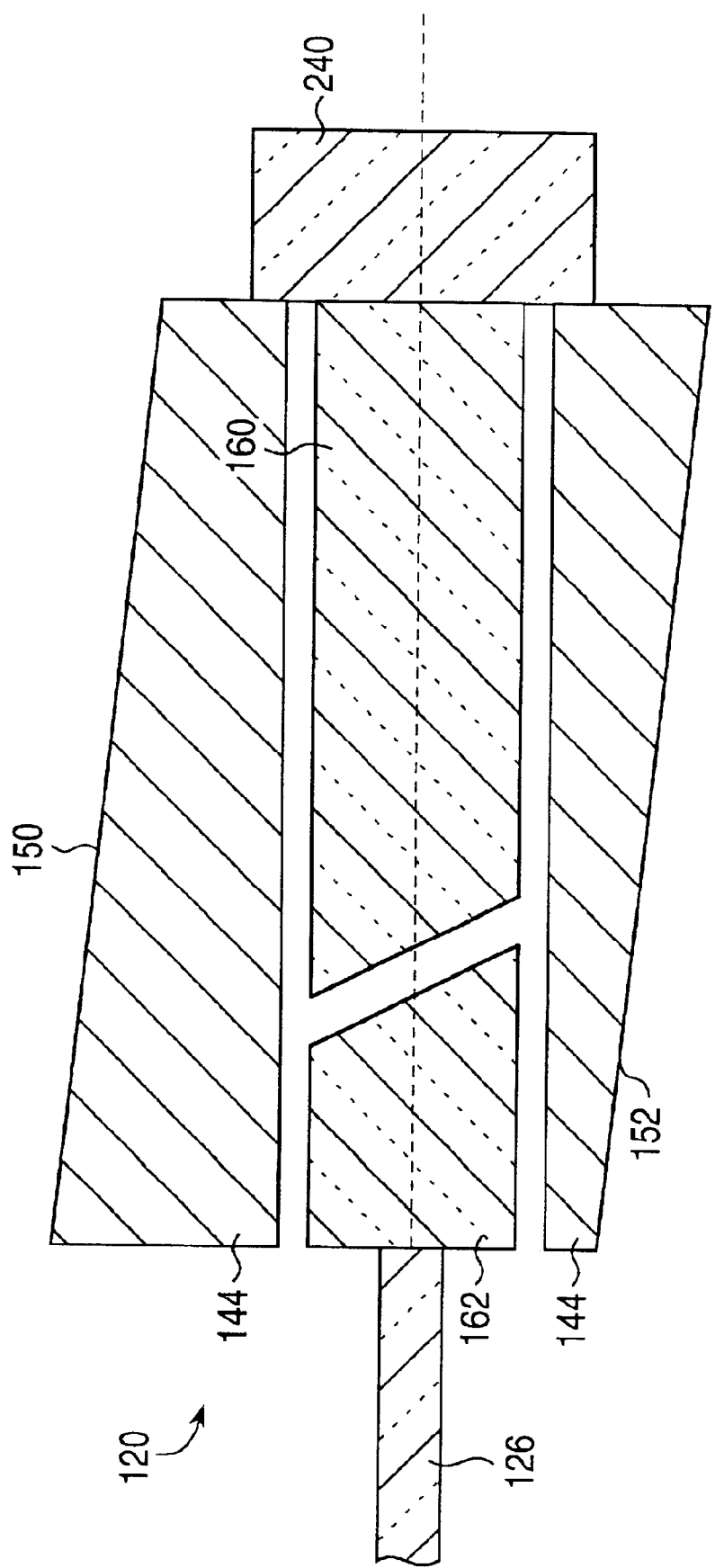

COLLIMATOR FOR READY FITTING TO AN OPTICAL DEVICE WITH PRECISE OPTICAL ALIGNMENT WITHOUT NEED FOR ADJUSTING POSITIONS OR ANGLES TO COMPENSATE FOR OFFSETS OR DEVIATIONS DURING OPTICAL DEVICE ASSEMBLY AND METHOD OF MAKING SAME

BACKGROUND OF THE INVENTION

1. Field of the Invention

The present invention relates to optical collimators, and more particularly, to collimators for precise alignment of optical paths and method of making same.

2. Background Art

Optical collimators have been widely used in optical fiber communications networks, systems and devices to collimate light transmitted by optical fibers, in order to form substantially parallel light beams in free space in various types of optical devices, especially non-integrated optical devices, including, for example, optical switches, isolators, attenuators, beam splitters and beam combiners. Collimators perform an important function of preventing excessive insertion loss due to dispersion of light beams in free space in these optical devices.

FIG. 1 shows a side sectional view of a conventional collimator with a graded index (GRIN) lens for collimating a light beam transmitted by an optical fiber. In FIG. 1, a section of optical fiber 2 has a terminal 4 connected to a capillary 6, which has an index of refraction $n_1$. The capillary 6 typically has a cylindrical shape with a center axis 8. In a conventional collimator with a GRIN lens 12, the capillary 6 typically has an end surface 10 which is slanted slightly off the normal to the center axis 8, in order to prevent total reflection of an incoming light beam received from the optical fiber 2 back to the optical fiber. The GRIN lens 12 also typically has a cylindrical shape centered about the axis 8 and an end surface 14 opposite the end surface 10 of the capillary 6.

In a conventional collimator, the end surface 14 of the GRIN lens 12 is also slanted slightly off the normal to the center axis 8. A gap 16 is typically provided between the end surface 10 of the capillary 6 and the end surface 14 of the GRIN lens 12. Both of these end surfaces may be slanted at an angle of about 8° off the normal to the center axis 8, for example, and are made to be substantially parallel to each other. In a conventional collimator, the gap 16 is typically filled with a gas such as air, which has an index of refraction $n_2$, while the GRIN lens 12 has an index of refraction $n_3$. In a conventional collimator equipped with a GRIN lens, the index of refraction $n_3$ of the GRIN lens is typically different from the index of refraction $n_1$ of the capillary 6 because they are made of different materials. Because of the differences between the indices of refraction $n_1$ and $n_2$ at the end surface 10 of the capillary 6 and between the indices of refraction $n_2$ and $n_3$ at the end surface 14 of the GRIN lens 12, an incoming light beam that enters the capillary 6 along the center axis 8 typically deviates from the center axis 8 at an angular deviation $\alpha$ with respect to the center axis when the light beam exits the GRIN lens 12.

Both the capillary 6 and the GRIN lens 12 are enclosed by a cylindrical metal sleeve 18, which may be made of gold plated stainless steel, for example, with a inner cylindrical surface 20 and an outer cylindrical surface 22 centered about the center axis 8. One or more concentric cylindrical layers of protective materials may be provided between the inner surface 20 of the metal sleeve 18 and side walls of the capillary 6 and the GRIN lens 12, depending upon the construction of the collimator. Because of process variations in the manufacturing of a conventional collimator such as the one shown in FIG. 1, slight variations in the angles of the slanted end surfaces 10 and 14 of the capillary 6 and the GRIN lens 12 may result in unpredictability of the angular deviation $\alpha$ of the output light beam 24 with respect to the center axis 8 of the collimator.

Furthermore, because the cylindrical collimator may be rotated unpredictably when it is assembled to an optical device, the direction of the output light beam 24 emanating from the collimator is even more unpredictable. In addition, the incoming light beam that enters the capillary 6 of the collimator from the optical fiber 2 may not be perfectly aligned with the center axis 8 of the collimator, thereby causing a translational offset $\Delta$ in addition to the angular deviation $\alpha$ with respect to the center axis. Other process variations such as tolerance of GRIN lens specifications may also contribute to the unpredictability of the direction of the output light beam emanating from the collimator.

When conventional collimators such as the one shown in FIG. 1 and described above are assembled to an optical device in which at least some of the light beams need to travel in free space between the collimators, alignment of light beams between different collimators can be very difficult and time-consuming. Translational offset and angular deviation of light beams emanating from collimators usually exist and are usually unpredictable regardless of the types of lenses used, such as conventional GRIN lenses, ball lenses or C lenses, even if they are manufactured with tight specifications. An output light beam emanating from a conventional collimator typically has a very small spot size with a diameter as little as 200 $\mu$m, for example. Therefore, even a slight offset or deviation may cause misalignment of optical paths between collimators in an optical device.

FIG. 2 illustrates a simplified sectional view of a typical non-integrated optical device, which may be an optical switch, an isolator, an attenuator, a beam splitter or a beam combiner, for example, with two collimators 26 and 28 serving as two optical ports of the device. An optical device element 30 may be movably positioned between the collimators 26 and 28. The optical device element 30 may be a prism or mirror if the optical device is an optical switch, or an attenuator or isolator element if the optical device is an isolator or attenuator, for example. The optical device typically has a metal packaging 32 for enclosing the optical element 30. In FIG. 2, the collimators 26 and 28 are fixed to sidewalls 34 and 36 of the metal packaging 32, respectively. The collimators may be fixed to the side walls of the packaging in various conventional manners, for example, by using epoxy gluing, tin soldering or laser welding techniques.

In a typical non-integrated optical device, such as a multi-port optical switch, the collimators 26 and 28 may be placed far from each other, with a distance measured in centimeters. The distances between different collimators in a multi-port optical device make optical alignment between the collimators even more difficult. A light beam travelling in free space within an optical device typically has a very narrow beam width that produces a very small light spot with a Gaussian distribution, with negligibly low light levels outside the spot area. A receiving collimator may not collect enough optical energy even if it is slightly out of alignment with the optical path of the light beam emanating from a transmitting collimator, thereby resulting in a huge loss of optical signals.

Alignment of collimators may be achieved in a typical non-integrated optical device by trial and error, although the labor intensiveness of such an approach is self-evident. The problem of alignment using the trial-and-error approach is exacerbated further in a multi-port optical device such as an M×N optical switch, which requires precise alignment of many different combinations of optical paths between the collimators through different combinations of optical switching elements, such as tilted mirrors or prisms. The problem associated with optical alignment is a major factor for the high cost and slow production rate of typical non-integrated multi-port optical switches at the present time.

Furthermore, when the collimators are fixed to the packaging of a typical optical device, whether by using epoxy glue, tin solder or laser welding, an assembly technician may need to continually adjust the orientation of each of the collimators while gluing, soldering or welding the collimator to the optical device packaging. Process variations in conventional gluing or soldering techniques may also ultimately affect the optical alignment of the collimators. For example, epoxy glue typically takes several hours to cure, and during the curing process, the epoxy glue may deform slightly to cause misorientation of the collimators after the application of the epoxy glue. If the collimators are soldered to the packaging of an optical device using tin solder, for example, the alignment of the collimators may be adversely affected by the heating, cooling and solidifying of solders around the metal sleeves of the collimators.

In order to facilitate the alignment of collimators in an optical device to compensate for the effects of translational offsets and angular deviations of light paths, optimization techniques have been proposed for collimator alignment using a laser source, a photodetector and optimization software on a computer. For example, a laser source (not shown) may be connected to an input optical fiber 38 which is connected to the first collimator 26 in FIG. 2, while a photodetector (not shown) may be connected to an output optical fiber 40 which is connected to the second collimator 28.

The laser source provides a light beam which emanates from the collimator 26 into the free space along an optical path 42, which has a translational offset and an angular deviation with respect to the center axis 43 of the first collimator 26. The first collimator 26 may be initially fixed to the sidewall 34 of the optical device packaging 32, while the second collimator 28 is initially movable such that it can reach the optical path 42 along which the light beam emanating from the first collimator 26 travels inside the optical device, to allow the photodetector which is connected to the second collimator 28 to detect the light beam. If the second collimator 28 can receive some optical energy from the light beam 42, the computer running the optimization software may at least theoretically be able to find an optimal position and orientation for the second collimator 28 to receive the light beam 42 emanating from the first collimator 26.

In practice, however, one needs to be lucky to find an initial position and orientation for the second collimator 28 to allow it to receive at least a detectable amount of optical energy in the first place, because the collimated light beam travelling along the optical path 42 may produce only a small light spot, for example, with a diameter as small as 200 $\mu$m. The light spot produced by the light beam along the optical path 42 typically has a Gaussian distribution with very low power densities outside the spot area. If the photodetector that is connected to the second collimator 28 is unable to detect the light beam in the first place, it would be a futile attempt for the computer optimization software to find the optimal position and orientation for the second collimator 28 to receive the light beam. Therefore, even with the aid of computer optimization software for the alignment of optical paths between different collimators in an optical device, one still needs to adjust the locations and orientations of the collimators by trial and error to obtain at least a coarse alignment before the computer can establish initial data points to run the optimization software to find appropriate alignment solutions.

The labor intensiveness and low productivity resulting from conventional optical alignment techniques are usually major contributing factors for high costs of manufacturing non-integrated optical devices. Furthermore, in multi-port optical devices, such as M×N optical switches, precise alignment of optical paths need be achieved for every switchable combination of every pair of input and output collimators. With manual adjustments of collimators to obtain precise optical alignment, adequate spacings need be provided between the collimators and optical elements, such as prisms or mirrors in case of an optical switch, to allow for such adjustments of the collimators. The need for manual adjustments of collimators using conventional optical alignment techniques makes it difficult to produce a compact non-integrated optical device with close spacings between collimators and optical elements.

SUMMARY OF THE INVENTION

The present invention provides a collimator for ready fitting to an optical device with precise alignment of the output optical path. In an embodiment, the collimator generally comprises:

a collimator lens; and a sleeve enclosing the collimator lens, the sleeve having an inner cylindrical surface centered about a collimator axis and an outer cylindrical surface that is concentric with the optical path which has a translational offset or an angular deviation with respect to the collimator axis.

The present invention also provides a method of making a collimator having a lens centered about a collimator axis and enclosed by an outer sleeve for precise alignment of an optical path emanating from the collimator, to obviate the need for adjusting the collimator to compensate for a translational offset or an angular deviation of the optical path with respect to the collimator axis. In an embodiment, the method generally comprises the step of removing a portion of the outer sleeve according to the offset and the deviation, to form an outer cylindrical surface centered about an axis that coincides with the optical path.

Advantageously, the collimator manufactured according to embodiments of the present invention with an outer cylindrical surface centered about an axis that coincides with the optical path emanating from the collimator can be readily fitted to an optical device without need for further adjustment of the position or orientation of the collimator in the optical device to achieve precise optical alignment. Furthermore, the time and labor cost required for manufacturing various types of optical devices can be greatly reduced with the implementation of collimators manufactured according to embodiments of the present invention, thereby significantly increasing the productivity in optical device manufacturing.

BRIEF DESCRIPTION OF THE DRAWINGS

The present invention will be described with respect to particular embodiments thereof, and references will be made to the drawings in which:

FIG. 17 is a side sectional view of a finished collimator assembly with an additional optical element, such as a filter or an isolator, at the output of the lens of the collimator.

DETAILED DESCRIPTION

Figure 1:
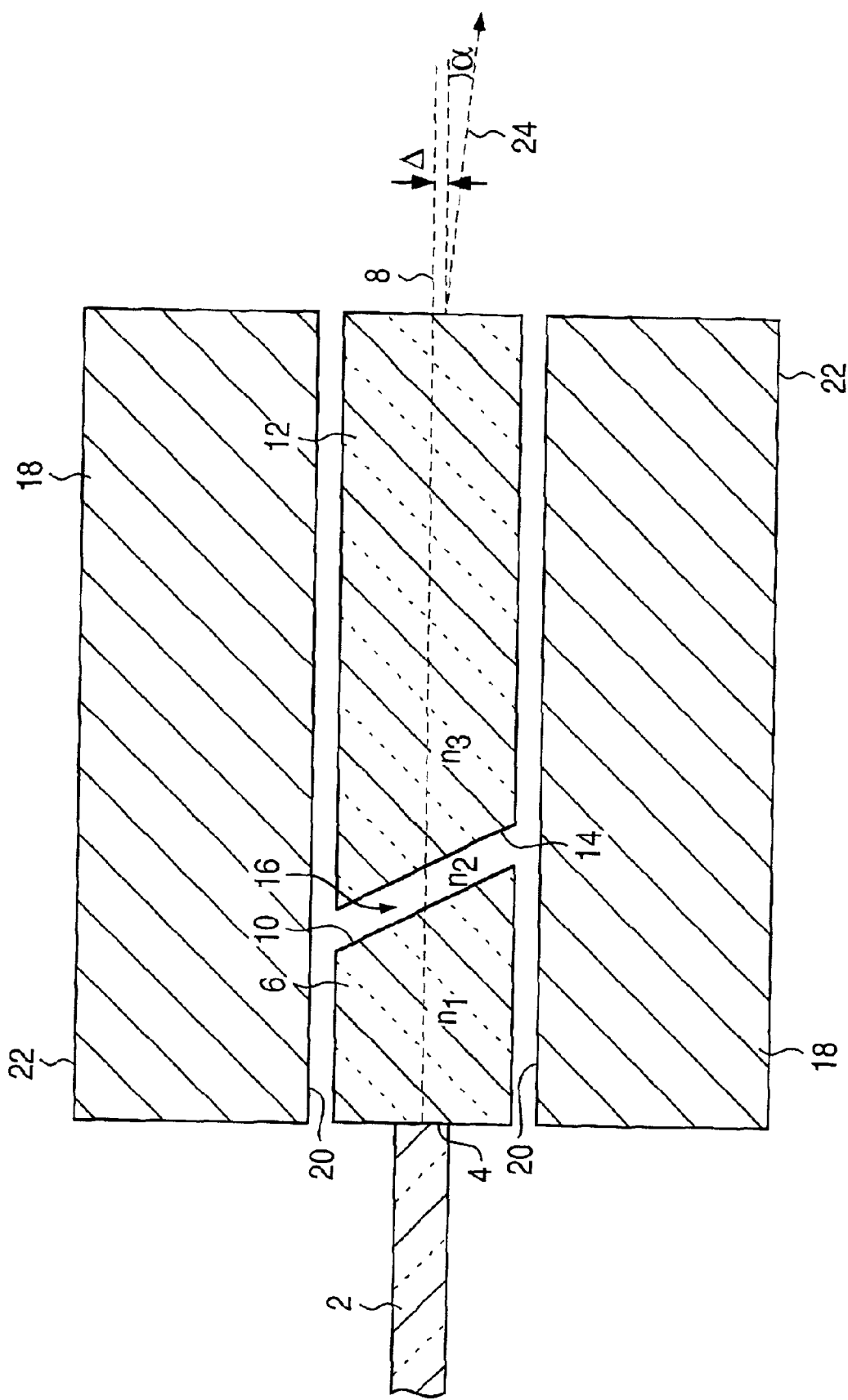
FIG. 1, described above, is a side sectional view of a conventional collimator with a GRIN lens, to illustrate a translational offset and an angular deviation of the optical path with respect to the collimator axis.
Figure 2:
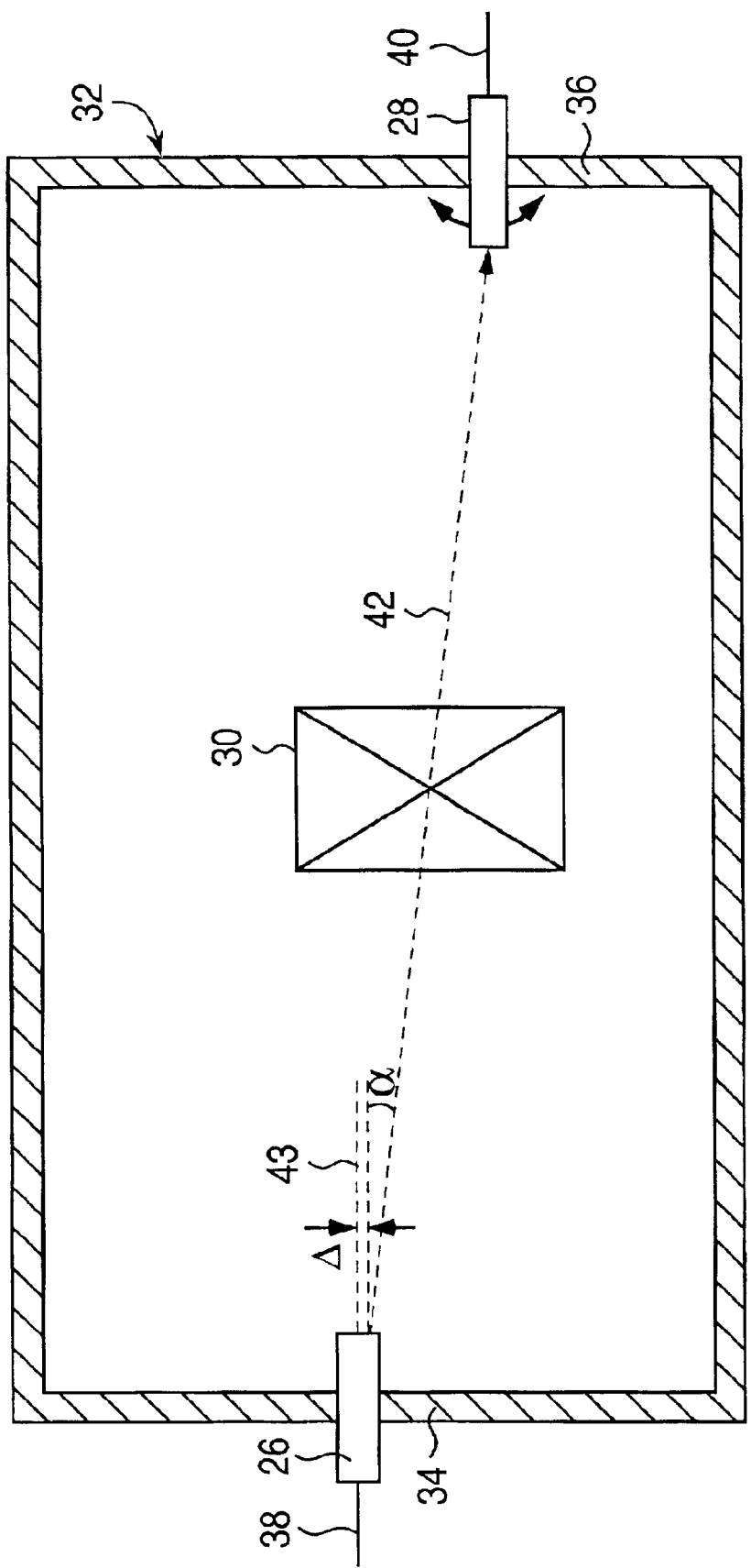
FIG. 2, described above, is a simplified side sectional view of a typical optical device, to illustrate the problems generally associated with conventional techniques of adjusting the collimators to obtain precise optical alignment in the optical device.
Figure 3:
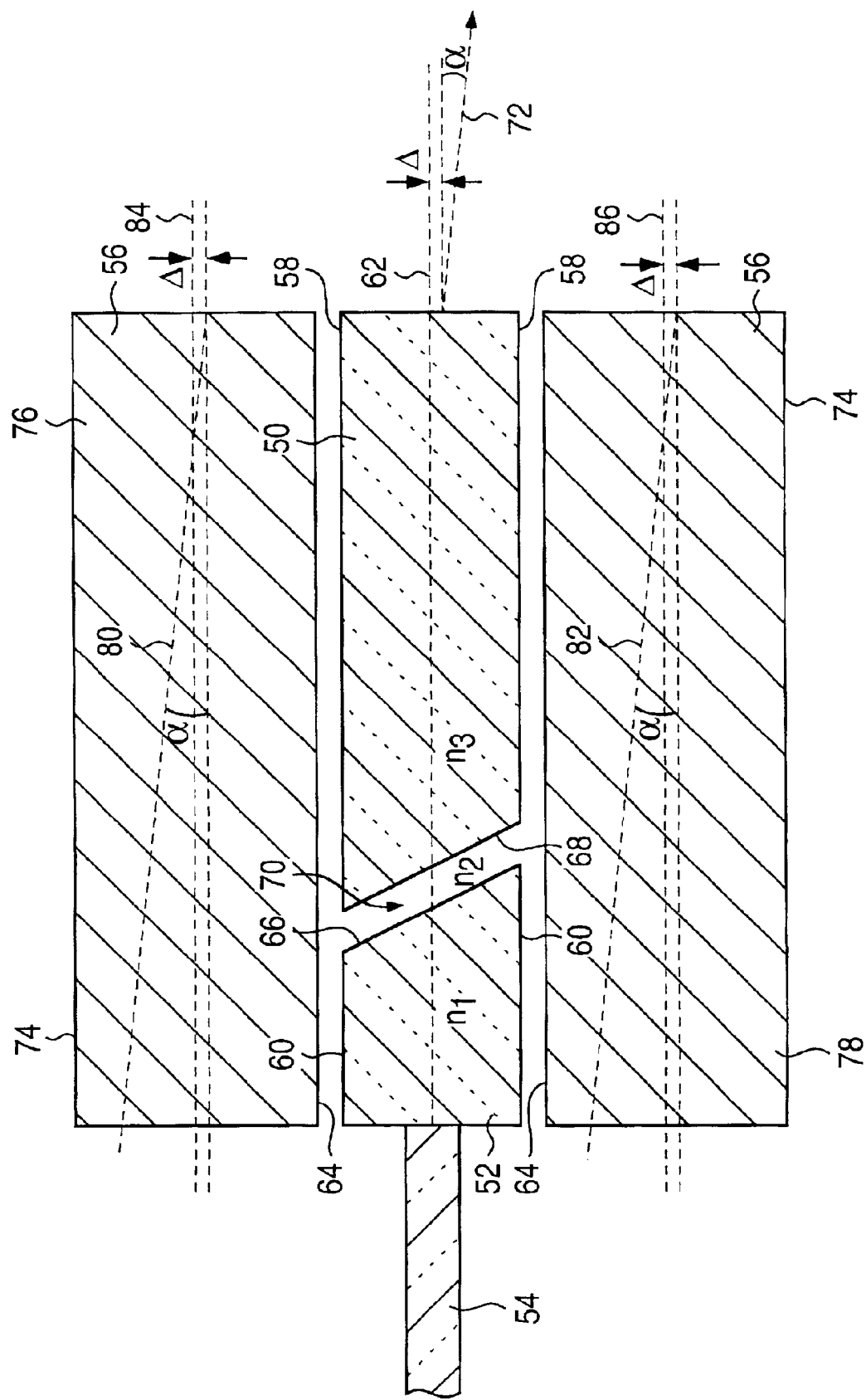
FIG. 3 is a side sectional view of a collimator with a GRIN lens, illustrating the removal of a portion of the outer sleeve to form an outer cylindrical surface which are concentric with the optical path emanating from the collimator according to an embodiment of the present invention.

FIG. 3 shows a side sectional view of a collimator comprising a graded index (GRIN) collimator lens 50, a capillary 52 positioned adjacent the lens 50 to transmit light to the lens, an optical fiber section 54 connected to the capillary 52 to transmit light to the capillary 52, and an outer metal sleeve 56 enclosing the collimator lens 50 and the capillary 52. The GRIN lens 50 and the capillary 52 have cylindrical sidewalls 58 and 60, respectively, both of which are centered about a geometric axis 62. The metal sleeve 56 has a cylindrical inner surface 64 that is concentric with the GRIN lens 50 and the capillary 52, and is therefore also centered about the collimator axis 62.

Depending on the particular construction of a collimator, the inner surface 64 of the metal sleeve 56 may be in direct contact with the sidewalls of 58 and 60 the GRIN lens 50 and the capillary 52, respectively. Alternatively, a concentric layer of glass (not shown) may be provided between the sidewalls 58 and 60 of the GRIN lens 50 and the capillary 52 and the inner surface 64 of the metal sleeve 56 in a manner apparent to a person skilled in the art. Whether an intermediary concentric layer is provided between the inner surface of the metal sleeve and the sidewalls of the collimator lens and the capillary is not critical to the present invention.

As shown in FIG. 3, the capillary 52 has an end surface 66 which is slanted at an angle off the normal to the collimator axis 62, to prevent total reflection of incoming light received from the optical fiber section 54 by the end surface 66 back to the optical fiber section 54. Similarly, the GRIN lens 50 also has an end surface 68 opposite the end surface 66 of the capillary 52 and slanted at an angle off the normal to the collimator axis 62. A gap 70 is formed between the end surfaces 66 and 68 of the capillary 52 and the GRIN lens 50, respectively.

The output light beam transmitted from the collimator lens 50 into free space usually deviates from the collimator axis 62 even if the incoming light beam entering the capillary 52 from the optical fiber section 54 is initially aligned with the collimator axis 62, because of the different indices of refraction $n_1$, $n_2$ and $n_3$ of the capillary 52, the air or gas in the gap 70, and the GRIN lens 50, respectively. The differences in the indices of refraction as well as the slanted surfaces 66 and 68 of the capillary 52 and the GRIN lens 50 cause the output light beam emanating from the GRIN lens 50 to travel along an optical path 72 which has an angular deviation $\alpha$ with respect to the collimator axis 62.

Furthermore, the end surfaces 66 and 68 of the capillary 52 and the GRIN lens 50 may not be perfectly parallel to each other due to process variations in the manufacturing of the collimator. The angular deviation $\alpha$ may be somewhat random and unpredictable because of process variations in the manufacturing of the collimator as well as various other factors. Moreover, the incoming light beam entering the capillary 52 from the optical fiber section 54 may not be perfectly centered about the collimator axis 62, thereby contributing to a translational offset $\Delta$ of the output light beam emanating from the collimator in addition to the angular deviation $\alpha$. Even within the same batch of collimators of an identical model produced by the same manufacturer, the translational offset and the angular deviation may be different for each of the collimators within the batch.

In an embodiment according to the present invention, the metal sleeve 56 of the collimator is machined to produce an outer cylindrical surface which is centered about an axis that coincides with the output optical path 72, on which the output light beam is transmitted from the GRIN lens 50 of the collimator into free space with a translational offset $\Delta$ and an angular deviation α with respect to the collimator axis 62. The metal sleeve 56 typically has a cylindrical outer surface 74 that is generally concentric with the inner surface 64 and centered about the collimator axis 62 before it is machined according to an embodiment of the present invention, although the outer surface 74 may not be perfectly cylindrical due to process variations in the initial manufacturing of the collimator. Whether or not the outer surface 74 was initially cylindrical before the machining process is not critical to the present invention.

In an embodiment according to the present invention, an outer portion indicated by sections 76, 78 of the metal sleeve 56 is removed to form an outer cylindrical surface along dashed lines 80 and 82 in the side sectional view of FIG. 3. The outer cylindrical surface indicated by dashed lines 80 and 82 are concentric with the output light beam emanating from the GRIN lens 50 of the collimator. In other words, the outer cylindrical surface indicated by dashed lines 80 and 82 is centered about an axis that coincides with the optical path 72 along which the center of the output light beam transmitted from the GRIN lens 50 travels in free space. Because the output optical path 72 has a translational offset Δ and an angular deviation α with respect to the collimator axis 62, the axis about which the outer cylindrical surface indicated by dashed lines 80 and 82 is centered is also displaced from the collimator axis 62 according to the translational offset Δ and the angular deviation α.

In the side sectional view shown in FIG. 3, an outer portion indicated by sections 76, 78 of the metal sleeve 56 is removed to form an outer cylindrical surface indicated by dashed lines 80, 82, with a translational offset Δ and an angular deviation α with respect to dashed reference lines 84, 86, respectively. The dashed reference lines 84 and 86 may be initially chosen arbitrarily and set at an equal distance from the collimator axis 62, provided that these reference lines are chosen to allow sufficient removal of the outer portion 76, 78 of the metal sleeve 56 to form the outer cylindrical surface that is concentric with the output optical path 72, while avoiding excessive removal of the metal sleeve.

Figure 4:
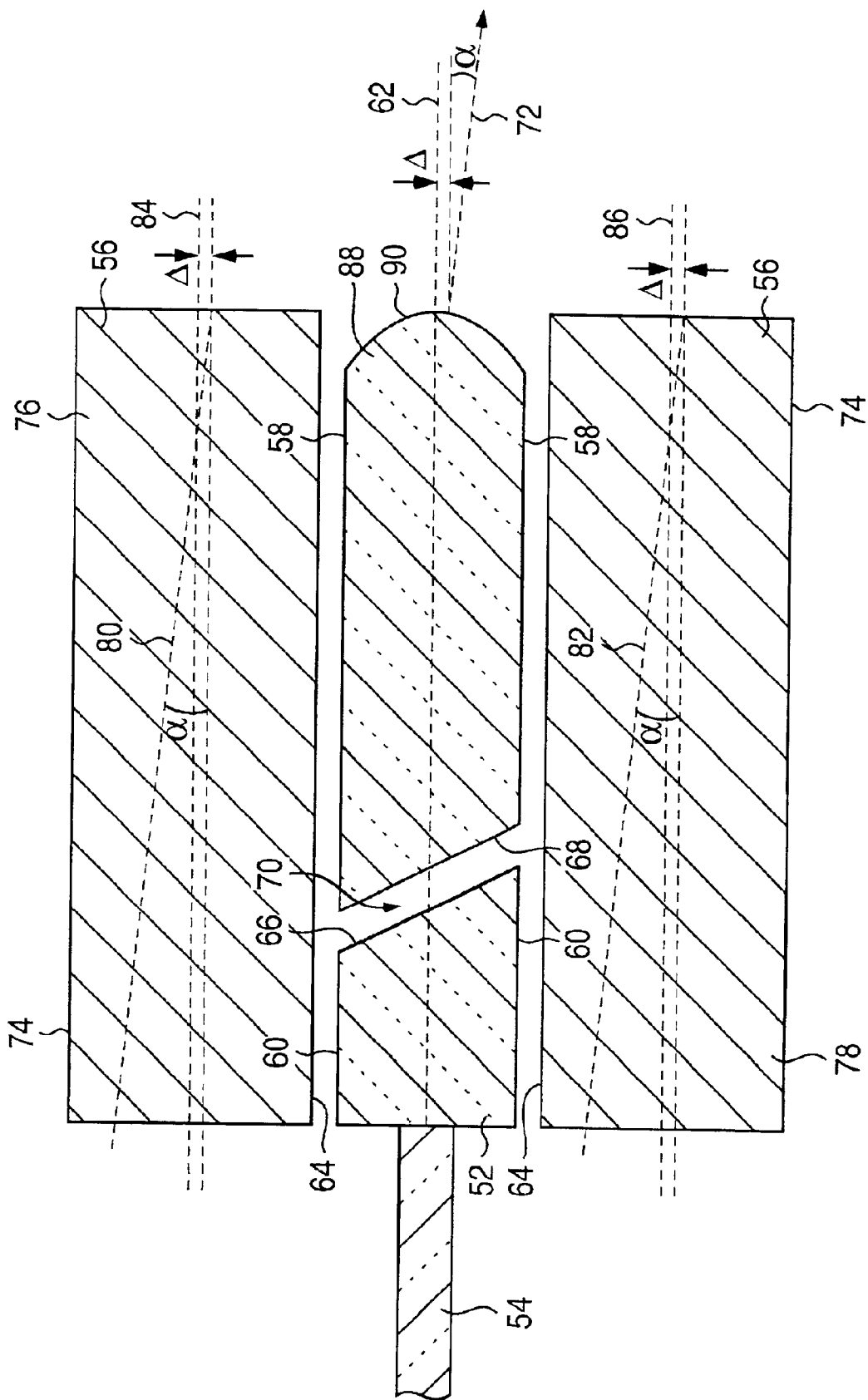
FIG. 4 is a side sectional view of a collimator similar to FIG. 3, with a C lens instead of a GRIN lens.
Figure 5:
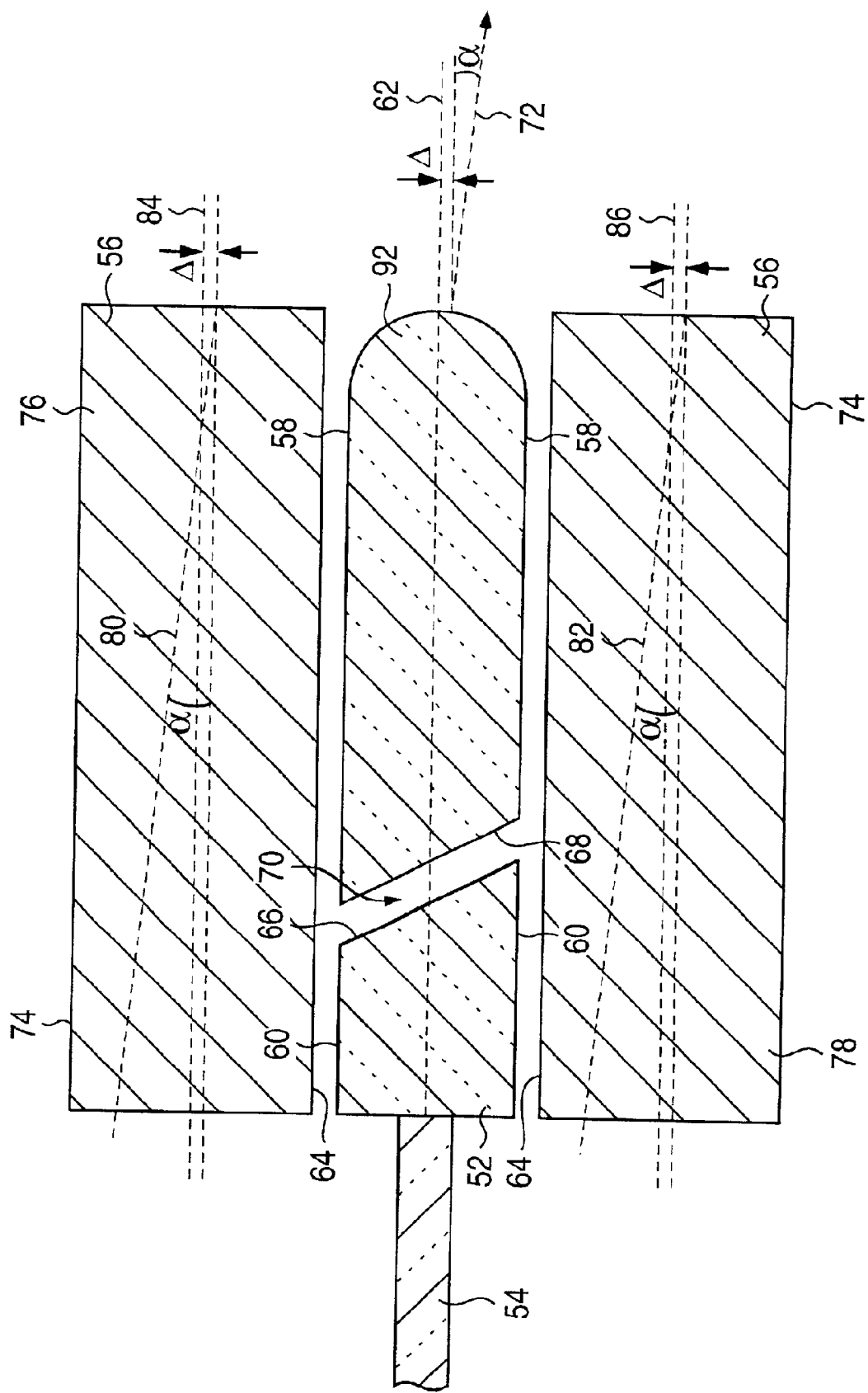
FIG. 5 is a side sectional view of a collimator similar to FIG. 3, with a ball lens instead of a GRIN lens.

FIG. 4 shows a side sectional view of a collimator similar to FIG. 3, with the GRIN lens 50 in FIG. 3 replaced by a C lens 88 with a curved collimating surface 90. FIG. 5 shows a side sectional view of a collimator similar to FIG. 3, with a hemispheric ball lens 92 replacing the GRIN lens 50 in FIG. 3. The outer metal sleeves 56 of these types of collimators may be machined to form outer cylindrical surfaces to compensate for translational offsets and angular deviations of output optical paths in a similar manner to that which is described above with reference to FIG. 3.

Collimators with other types of lenses or other optical structures can also be machined to compensate for possible translational offsets and angular deviations in a similar manner. After the outer sleeve of each collimator is machined to form an outer cylindrical surface that is centered about an axis which coincides with the output optical path emanating from the collimator, the collimator is ready for fitting to an optical device to achieve precise alignment of optical paths, while obviating the need for further adjustment of the position or orientation of each collimator to compensate for the translational offset or angular deviation as would be required in a time-consuming, labor-intensive conventional alignment process.

For a typical collimator, the angular deviation and the translational offset are usually very small. In FIGS. 3–5 described above, the angular deviation α as well as the translational offset Δ may be exaggerated for the purpose of illustration. In reality, however, even a small angular deviation and a small translational offset may cause great difficulties in a conventional alignment process. Therefore, the removal of the outer portion 76, 78 of the metal sleeve 56 in FIGS. 3–5 need be achieved very precisely. Furthermore, the angular deviation α and the translational offset Δ of the output optical path 72 with respect to the collimator axis 62 need be measured very precisely instead of by trial and error before the metal sleeve 56 is machined to form the outer cylindrical surface to compensate for the translational offset and the angular deviation.

Figure 6:
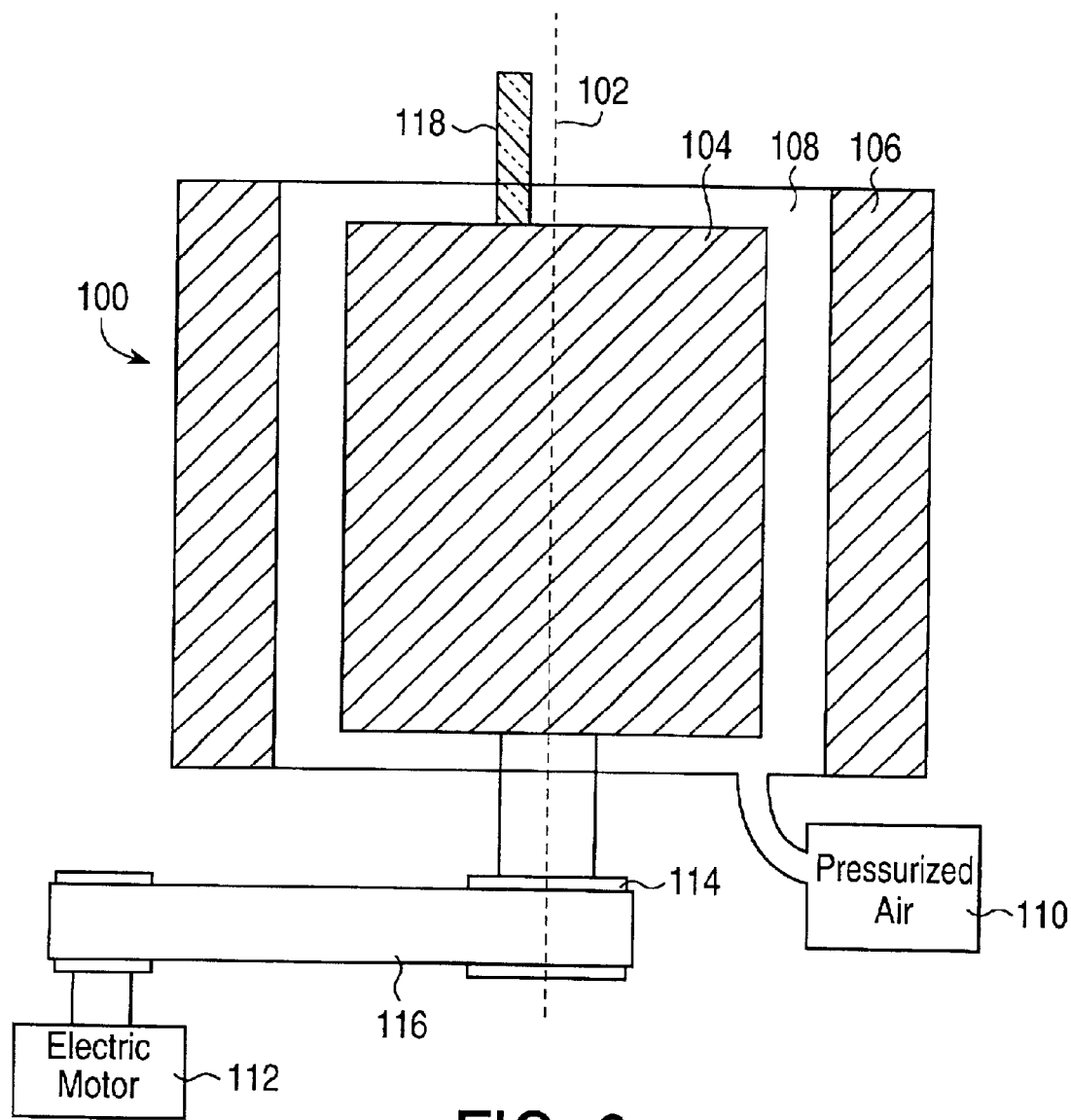
FIG. 6 is a side view of an embodiment of an apparatus with an air bearing and a diamond knife for machining the collimators of FIGS. 3–5 according to embodiments of the present invention.

FIG. 6 shows an embodiment of an apparatus for machining the outer metal sleeve of a collimator to form the outer cylindrical surface to compensate for a translational offset and an angular deviation. In this embodiment, an air bearing 100 is provided which is capable of rotating about a stable bearing axis 102. An air bearing that is capable of a very high rate of rotation, for example, approximately 10,000 rotations per minute (rpm), with a very high degree of axial stability is commercially available at the present time. In a typical air bearing, an inner cylinder 104 is surrounded by an outer annulus 106 without direct contact. The inner cylinder 104 is separated from the outer annulus 106 by a gap 108 filled with pressurized air or gas. The pressurized air may be supplied by a high pressure air supply 110, such as an air pump or a pressurized air bottle.

In the embodiment shown in FIG. 6, the outer annulus 106 of the air bearing 100 is fixed while the inner cylinder 104 is rotating. In an embodiment, an electric motor 112, such as a stepper motor, drives the inner cylinder 104 at a high rate of rotation. In the embodiment shown in FIG. 6, the inner cylinder 104 of the air bearing 100 is connected to a wheel 114, which is driven by a belt 116 connected to the electric motor 112. The driving mechanism for the air bearing 100 is not critical to the present invention, as long as the air bearing is capable of maintaining a very high degree of axial stability while rotating.

In the embodiment shown in FIG. 6, a cutter 118 is provided on the inner cylinder 104 of the air bearing 100, to cut a portion of the metal sleeve of a collimator to form the desired outer cylindrical surface which is concentric with the output optical path emanating from the collimator. Because the metal sleeve of a conventional collimator is typically made of a hard material such as stainless steel, it is desirable that the cutter 118 be capable of cutting the metal sleeve with a high degree of stability and precision. In an embodiment, the cutter 118 comprises a diamond knife with a precise straight cutting edge for cutting the outer portion of the metal sleeve. The diamond cutting knife 118, which is attached to the air bearing 100, is capable of cutting the metal sleeve portion by rotating about the bearing axis 102 with a very high degree of stability, because the inner cylinder 104 of the air bearing 100 is capable of rotating at a high rate of rotation about the bearing axis 102 with a very high degree of concentricity.

Figure 7:
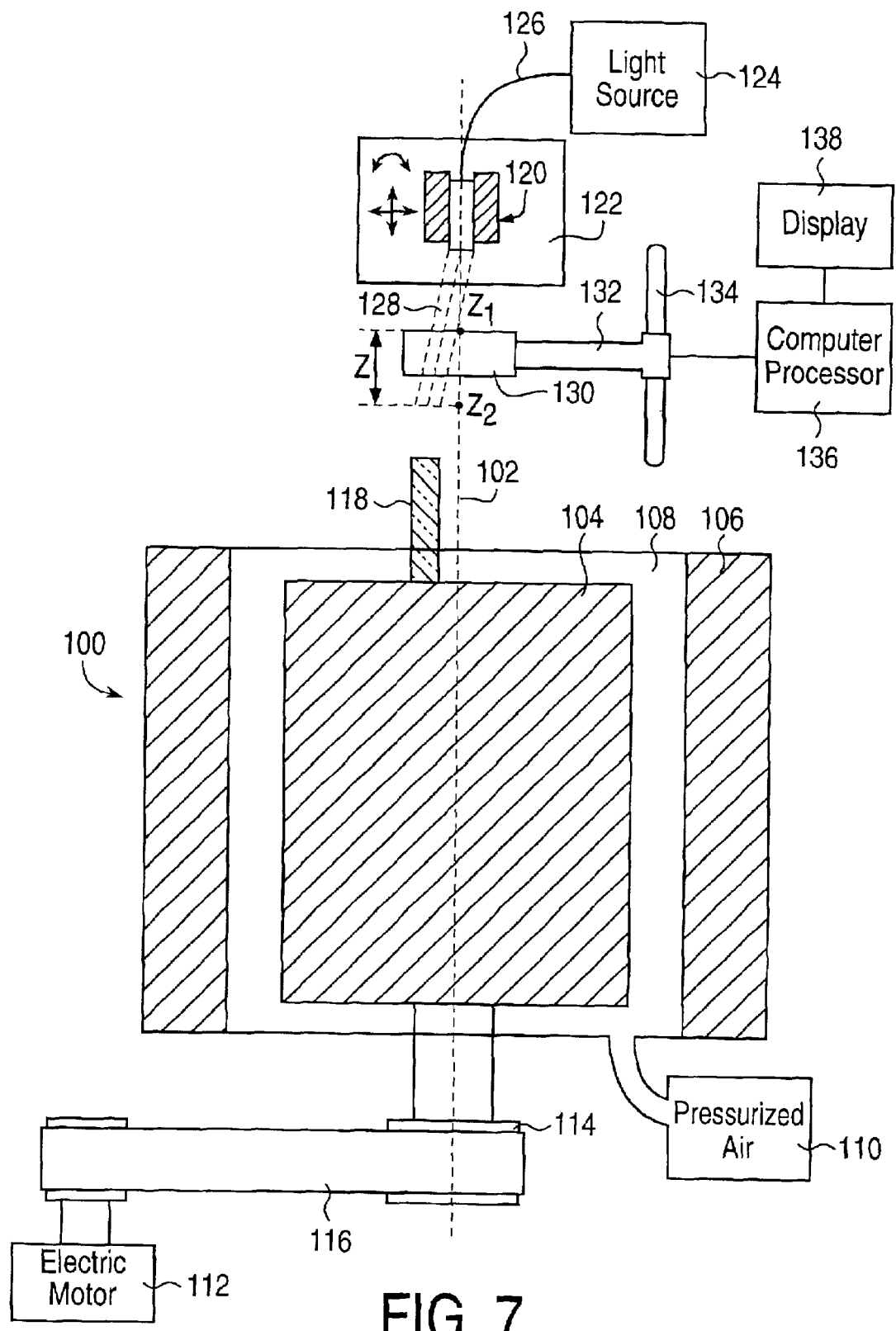
FIG. 7 shows an embodiment of an apparatus including the machining apparatus of FIG. 6, a charge coupled device (CCD) camera and a computer for determining the offset and deviation of the light beam emanating from the collimator and aligning the collimator prior to machining according to an embodiment of the present invention.

FIG. 7 shows an apparatus for determining the translational offset and the angular deviation of the output optical path of a typical collimator before the metal sleeve of the collimator is machined by the apparatus of FIG. 6. In FIG. 7, the air bearing 100 to which the diamond cutting knife 118 is attached provides a highly stable bearing axis 102 that is used as a reference for the determination of the translational offset and the angular deviation.

The collimator 120 is held securely on an adjustable support 122 which can be moved translationally and angularly. The adjustable support 122 is capable of moving the collimator 120 very precisely with fine adjustments in translational or angular displacement, either manually or by an automatic controller. The collimator 120 is connected to a light source 124, such as a laser source capable of emitting a laser beam at a desired wavelength, through an optical fiber 126, such as a single mode fiber. The light source 124 transmits a light beam through the collimator 120 to provide a light spot along an output optical path 128 emanating from the collimator 120. Depending upon the wavelength spectrum used by the optical fiber system in which the collimator is to be implemented, the light source 124 may be a laser source that emits a laser beam at a center wavelength of that spectrum. For example, a typical optical fiber communications network may utilize infrared spectra around the wavelengths of 1300 nm and 1550 nm.

In an embodiment, a light sensor such as a charge coupled device (CCD) camera 130 is provided to detect the light spot generated by the light source 124 through the collimator 120 at two different longitudinal positions $z_1$ and $z_2$ along the bearing axis 102. In the embodiment shown in FIG. 7, the CCD camera 130 is positioned on a sliding arm 132 which is movable longitudinally along a guide rail 134. In this embodiment, the guide rail 134 is parallel to the axis 102 of the air bearing 100 to allow the CCD camera 130 to move only in the longitudinal directions while detecting images of the light spot.

Figure 8A:
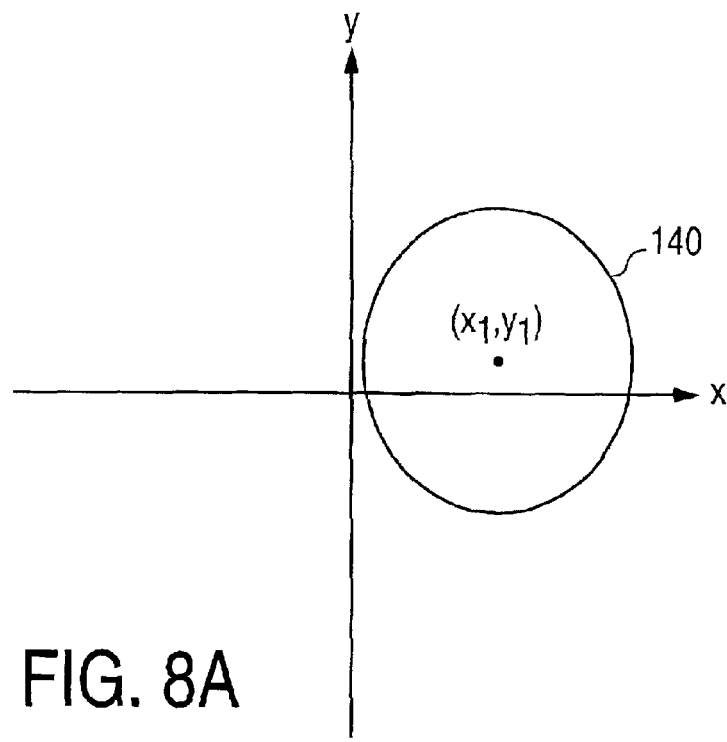
FIGS. 8A–8B illustrate images of light spots detected by the CCD camera in FIG. 7 on a transverse planar coordinate at two different longitudinal locations.

In an embodiment, the images of the light spot produced by the collimator 120 and detected by the CCD camera 130 are captured by a computer processor 136 and shown on a display 138, such as a computer monitor. The computer processor 136 may be connected to the CCD camera 130 by a conventional interface. The CCD camera 130 is initially located at a first predetermined longitudinal position $z_1$, to allow the computer processor 136 to capture a first image of the light spot on a transverse planar coordinate, for example, a Cartesian coordinate (x, y) as shown in FIG. 8A. The image of the light spot 140, which typically has a substantially circular or elliptical shape as shown in FIG. 8A, is displayed on the computer monitor 138 in FIG. 7 with reference to a Cartesian coordinate with an x-axis and a y-axis. Based upon the image of the light spot 140 as shown in FIG. 8A, the computer determines a first center point ($x_1$, $y_1$) of the light spot 140 when the CCD camera is at the first longitudinal position $z_1$ as shown in FIG. 7.

Figure 8B:
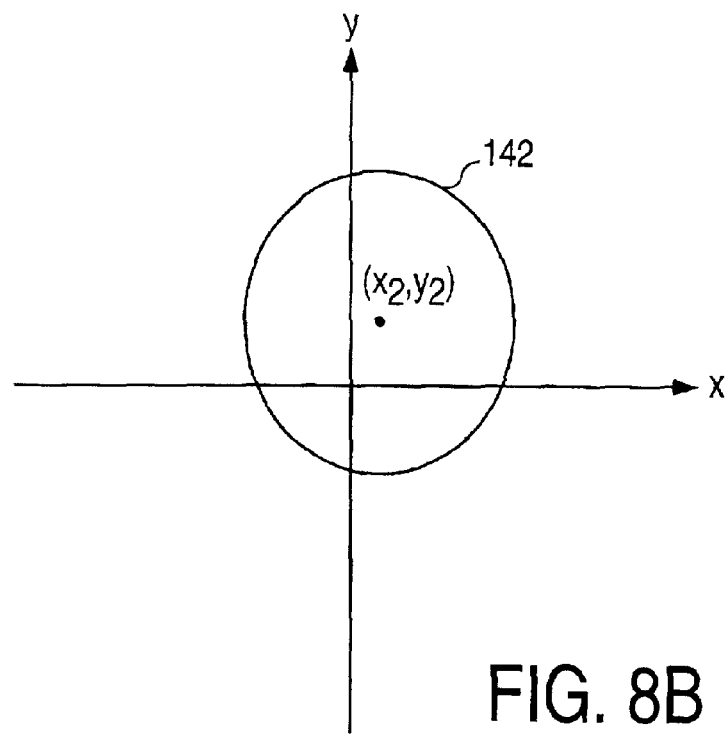

After the CCD camera 130 has moved longitudinally from the first longitudinal position $z_1$ to the second longitudinal position $z_2$ by a distance Z as shown in FIG. 7, a second image of the light spot 142 as shown in FIG. 8B is captured by the computer processor 136 and displayed on the monitor 138. Based upon this image, the computer determines a second center point ($x_2$, $y_2$) of the light spot 142 as shown in FIG. 8B on the same transverse planar Cartesian coordinate as the one shown in FIG. 8A. If the output light path 128 emanating from the collimator 120 as shown in FIG. 7 has an angular deviation with respect to the axis 102 of the air bearing 100, the second center position ($x_2$, $y_2$) of the light spot 142 shown in FIG. 8B when the CCD camera 130 is at the second longitudinal position $z_2$ would be different from the first center position ($x_1$, $y_1$) of the light spot 140 shown in FIG. 8A when the CCD camera 130 is at the first longitudinal position $z_1$.

In order to compensate for a possible translational offset of the output light beam emanating from the collimator in addition to the angular deviation, the origin of the Cartesian coordinate, which serves as a reference for the center points of the light spots as shown in FIGS. 8A and 8B, may be set at a predetermined point along the axis 102 of the air bearing 100 as shown in FIG. 7. In an embodiment, an arbitrary point on the bearing axis 102 is selected as an absolute reference point as the first longitudinal position $z_1$ for the CCD camera 130. The initial transverse position of the CCD camera 130 at the first longitudinal position $z_1$ is adjusted until the center point of the CCD camera matches the point which is selected as the absolute reference point on the bearing axis 102. After the CCD camera 130 has been centered at that point along the bearing axis 102, the transverse position of the CCD camera is fixed on the sliding arm 132 and subsequently can only be moved longitudinally parallel to the guide rail 134.

Figure 9:
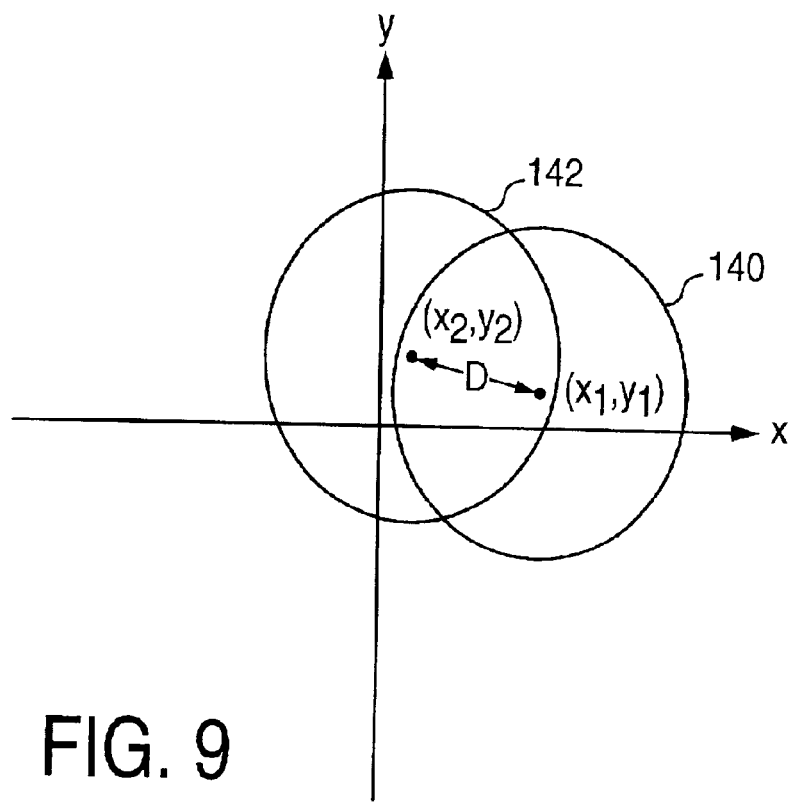
FIG. 9 shows center positions $(x_1, y_1)$ and $(x_2, y_2)$ of the light spots in FIGS. 8A and 8B superimposed on the same planar coordinate.

When the CCD camera 130 is moved from the first longitudinal position $z_1$ to the second longitudinal position $z_2$, the origin of the transverse planar Cartesian coordinate does not change with respect to the bearing axis 102. If an angular deviation exists in the light beam emanating from the collimator 120, the center position of the light spot on the transverse Cartesian coordinate when the CCD camera is at the second longitudinal position $z_2$ would be different from the center position of the light spot on the same coordinate when the CCD camera is at the first longitudinal position $z_1$. After the center points of the light spots at the two longitudinal positions of the CCD camera are obtained by the computer, the computer may superimpose these two center points on the Cartesian coordinate on the computer monitor as shown in FIG. 9. The transverse distance D between these two center points is $\sqrt{(x_2-x_1)^2+(y_2-y_1)^2}$.

Figure 10:
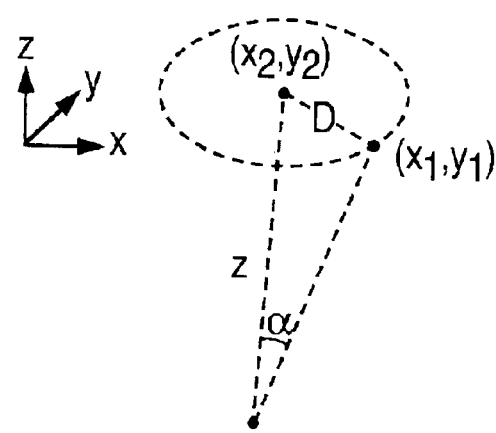
FIG. 10 illustrates the relationship of the angular deviation $\alpha$ with respect to the planar center positions $(x_1, y_1)$ and $(x_2, y_2)$ of the light spots and a longitudinal distance Z moved by the CCD camera.

FIG. 10 illustrates the relationship of the angular deviation α of the output light beam with respect to the transverse distance D and the longitudinal distance Z on a three-dimensional Cartesian coordinate (x, y, z). In FIG. 10, the first and second center points ($x_1$, $y_1$) and ($x_2$, $y_2$) are identical to those shown in FIG. 9. The vertical displacement z is the distance between the first and second longitudinal positions $z_1$ and $z_2$ of the CCD camera 130 as shown in FIG. 7. Referring to FIG. 10, the angular deviation α can be derived from the transverse distance D between the first and second center points of the light spot and the longitudinal distance Z according to the following relationship:

$$\alpha = \arctan\frac{D}{Z}.$$

This angular deviation may be computed by the processor 136 automatically. Alternatively, the images of the light spots as shown in FIGS. 8A and 8B obtained by the CCD camera 130 at respective first and second longitudinal positions $z_1$ and $z_2$ may be captured on the display 138 for a human operator to calculate the angular deviation.

After the center positions of the light spot as shown in FIGS. 8A and 8B are obtained and the angular deviation α determined for the output optical path of the collimator 120 in FIG. 7, the support 122 that securely holds the collimator 120 is adjusted until the light spot detected by the CCD camera 130 is centered at the origin of the transverse Cartesian coordinate (x, y). The adjustable support 122 may be moved manually with fine tuning, or automatically controlled by the computer processor 136, which has already determined the angular deviation α.

If only a translational offset but no angular deviation is present for the output light beam emanating from the collimator 120 in FIG. 7, the adjustable support 122 need only be moved transversely until the light spot detected by the CCD camera is centered at the origin of the transverse Cartesian coordinate (x, y), thereby aligning the center axis of the output optical path 128 with the axis 102 of the air bearing 100. If only an angular deviation but no translational offset is present for the output light beam emanating from the collimator 120, the adjustable support 122 that securely holds the collimator 120 need be rotated angularly until the light spot detected by the CCD camera 130 is centered at the origin of the Cartesian coordinate (x, y).

If both a translational offset and an angular deviation are present for the light beam emanating from the collimator 120, the adjustable support 122 may need be moved both transversely and angularly until the light spot detected by the CCD camera 130 is centered at the origin of the transverse Cartesian coordinate (x, y). In any of these scenarios, the output optical path along which the light beam emanating from the collimator 120 travels in free space is aligned with the axis 102 of the air bearing 100. The alignment is performed when the center of the CCD camera 130 is on the bearing axis 102, regardless of the longitudinal position of the CCD camera. During the processes of detecting and capturing of the light spot, determining the angular deviation, and moving the adjustable support to achieve optical alignment with the bearing axis, the inner cylinder 104 of the air bearing 100 maintains a high rate of rotation such that the bearing axis 102 is highly stable for providing an absolute reference as the origin of the transverse planar coordinate (x, y).

After the position and orientation of the collimator 120 have been adjusted for precise alignment of the output optical path with the axis 102 of the air bearing 100, the CCD camera is removed from the output optical path of the collimator. The adjustable support 122 that securely holds the collimator 120 is moved longitudinally toward the cutter 118 which is attached to the rotating air bearing 100, to remove a portion of the metal sleeve of the collimator to compensate for the translational offset Δ and the angular deviation α of the output optical path according to FIG. 3. To ensure precise removal of the outer portion of the metal sleeve without deformation, the cutter 118 comprises a diamond knife with a straight cutting edge 119 in an embodiment to produce the outer cylindrical surface which is concentric with the output light beam.

Figure 11:
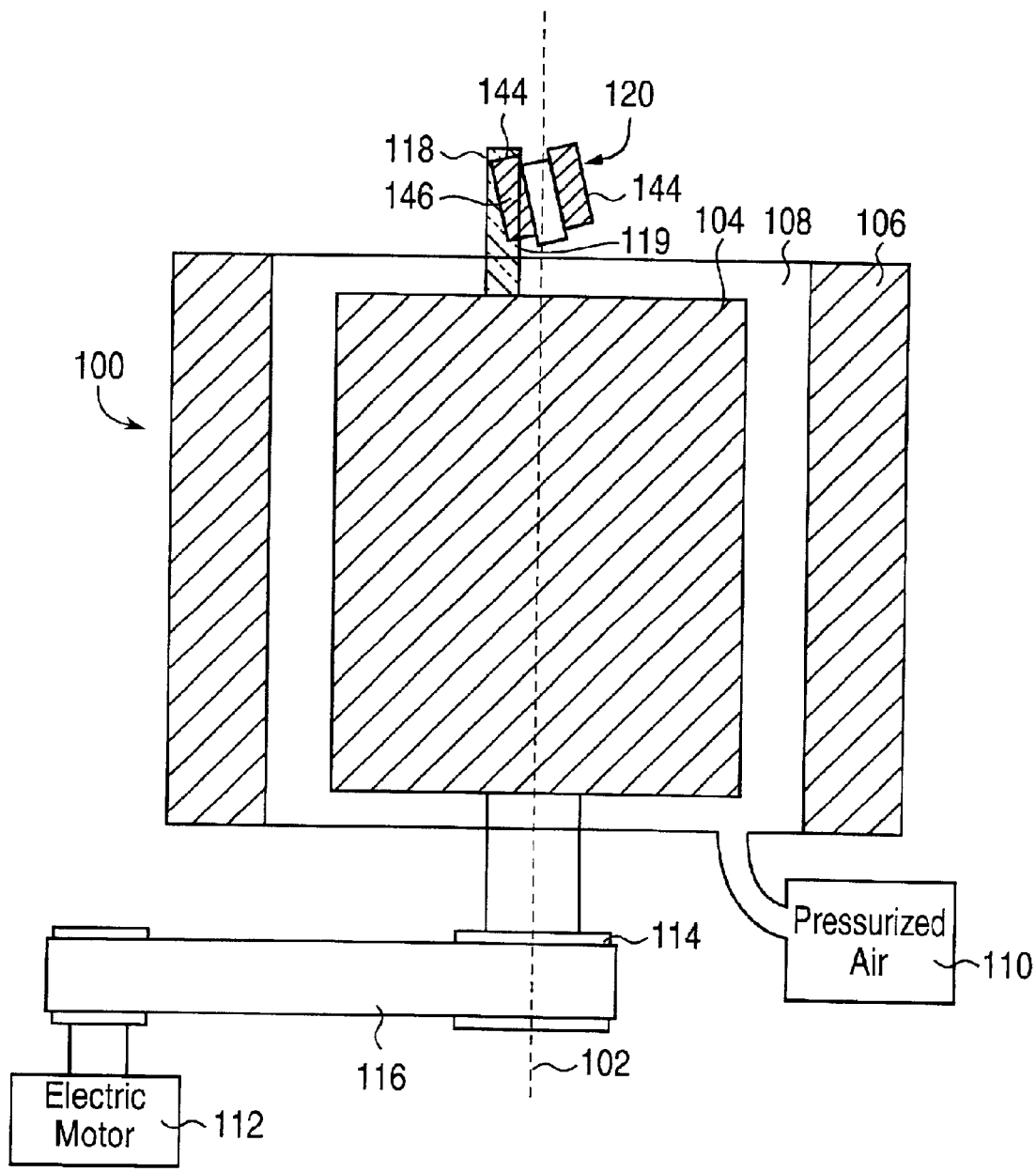
FIG. 11 shows the machining apparatus of FIG. 6 removing a portion of the outer sleeve of the collimator which has been moved to a tilted position to account for the offset and the deviation.
Figure 12:
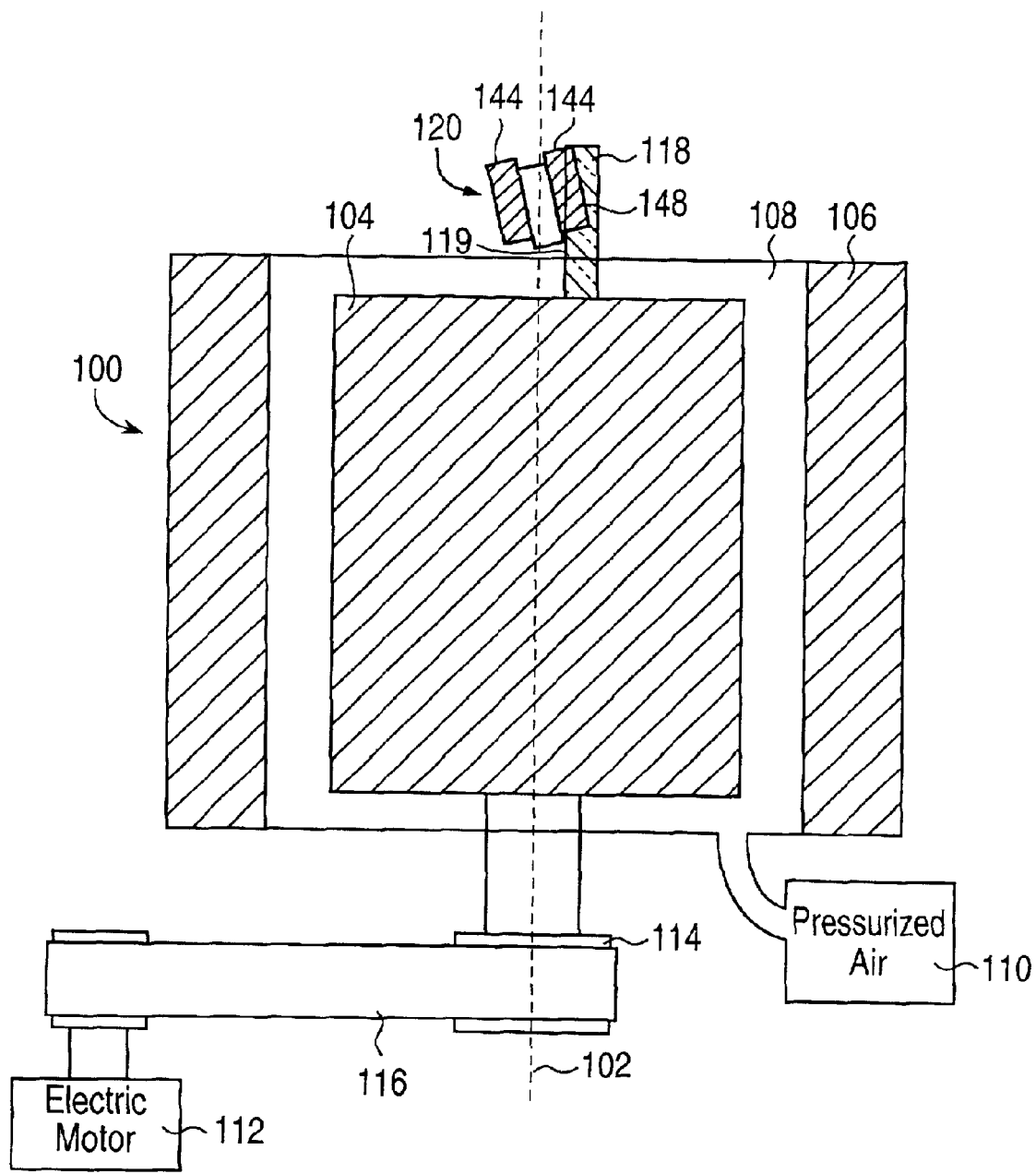
FIG. 12 shows the machining apparatus of FIG. 11 removing another portion of the outer sleeve of the collimator which has been moved to the tilted position to account for the offset and the deviation.

FIG. 11 shows the machining apparatus with a diamond cutting knife 118 attached to the rotating inner cylinder 104 of the air bearing 100 as it removes a portion indicated by section 146 of the metal sleeve 144 of the collimator 120. Similarly, FIG. 12 illustrates the removal of a portion indicated by section 148 of the metal sleeve 144 when the diamond knife 118 is rotated to another side of the collimator. The portion 146, 148 of the metal sleeve 144 is removed to form the outer cylindrical surface indicated by lines 150 and 152, respectively, in the side sectional view of FIG. 13.

Figure 13:
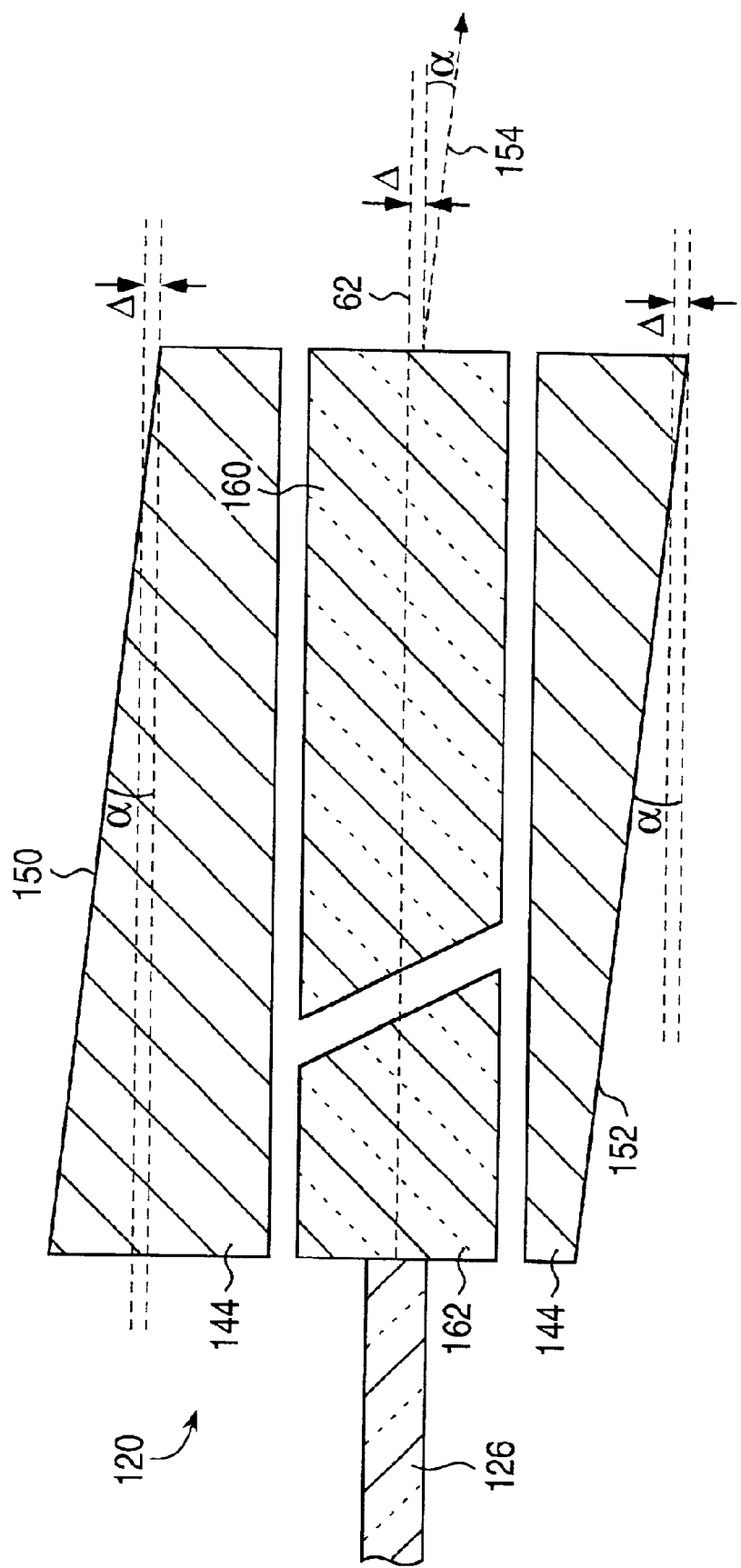
FIG. 13 is a side sectional view of a finished collimator product having a GRIN lens, with a portion of the outer sleeve removed to form an outer cylindrical surface according to an embodiment of the present invention.

In FIG. 13, the outer cylindrical surface 150, 152 formed by the diamond cutting knife on the metal sleeve 144 of the collimator 120 are concentric with the optical path 154 along which the output light beam emanating from the collimator travels in free space with a translational offset Δ and an angular deviation α with respect to the collimator axis 62. In other words, the outer cylindrical surface 150, 152 of the metal sleeve 144 are centered about an axis which is displaced from the collimator axis 62 according to the translational offset Δ and the angular deviation α.

In FIG. 11, the location of the cutting edge 119 of the diamond knife 118 with respect to the bearing axis 102 is determined according to the dashed reference lines 84 and 86 as shown in FIG. 3, to avoid excessive cutting of the metal sleeve while ensuring that a sufficiently large outer cylindrical surface is formed for ready fitting to an optical device. The machined surfaces 150 and 152 of the outer sleeve 144 of the collimator as shown in FIG. 13 are ready for fitting to an optical device using a conventional technique, for example, laser welding, such that the output light beam is transmitted from the collimator lens along the optical path 154 coinciding with an axis about which the machined outer cylindrical surfaces 150 and 152 are centered.

Figure 14:
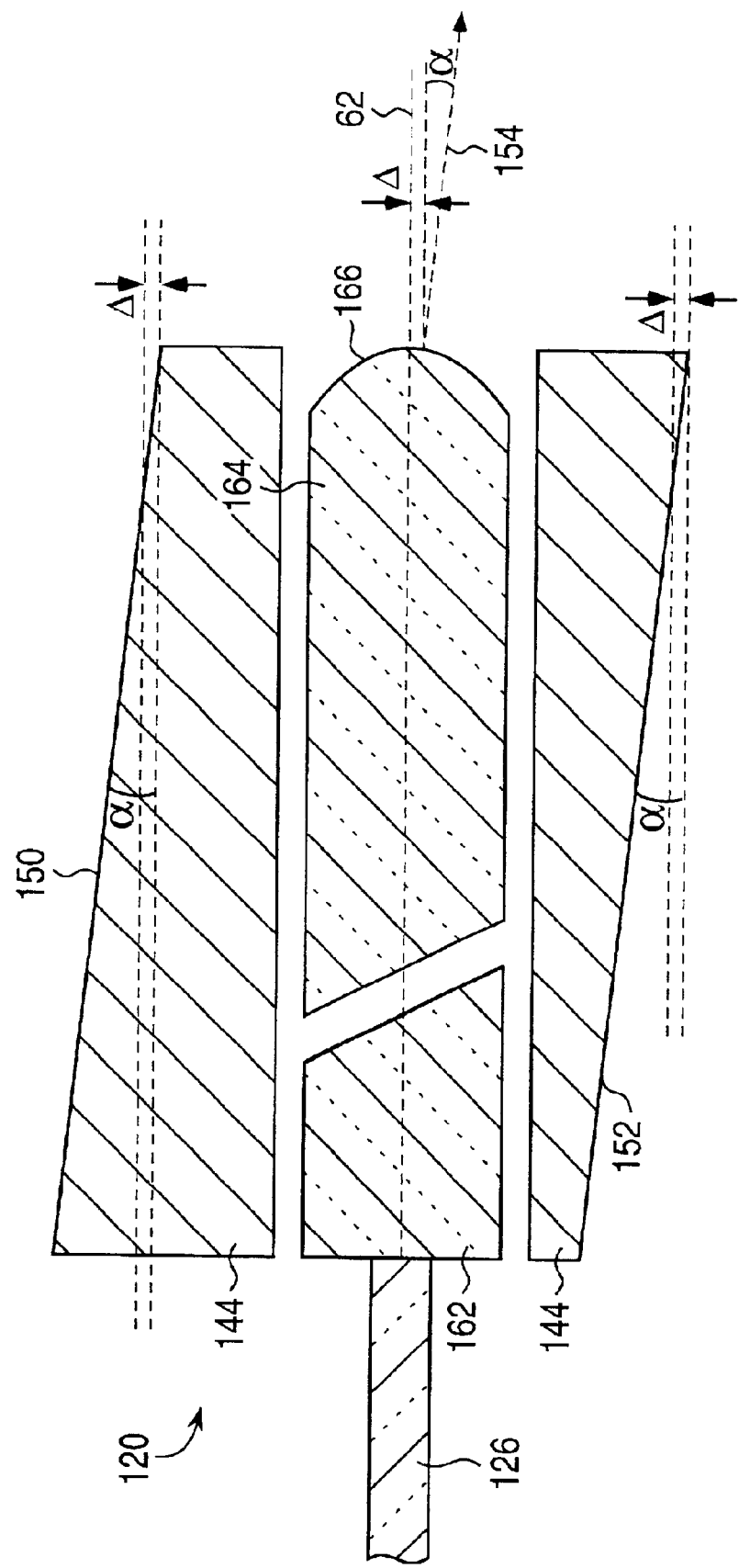
FIG. 14 is a side sectional view of a finished collimator product similar to FIG. 13, with a C lens instead of a GRIN lens.
Figure 15:
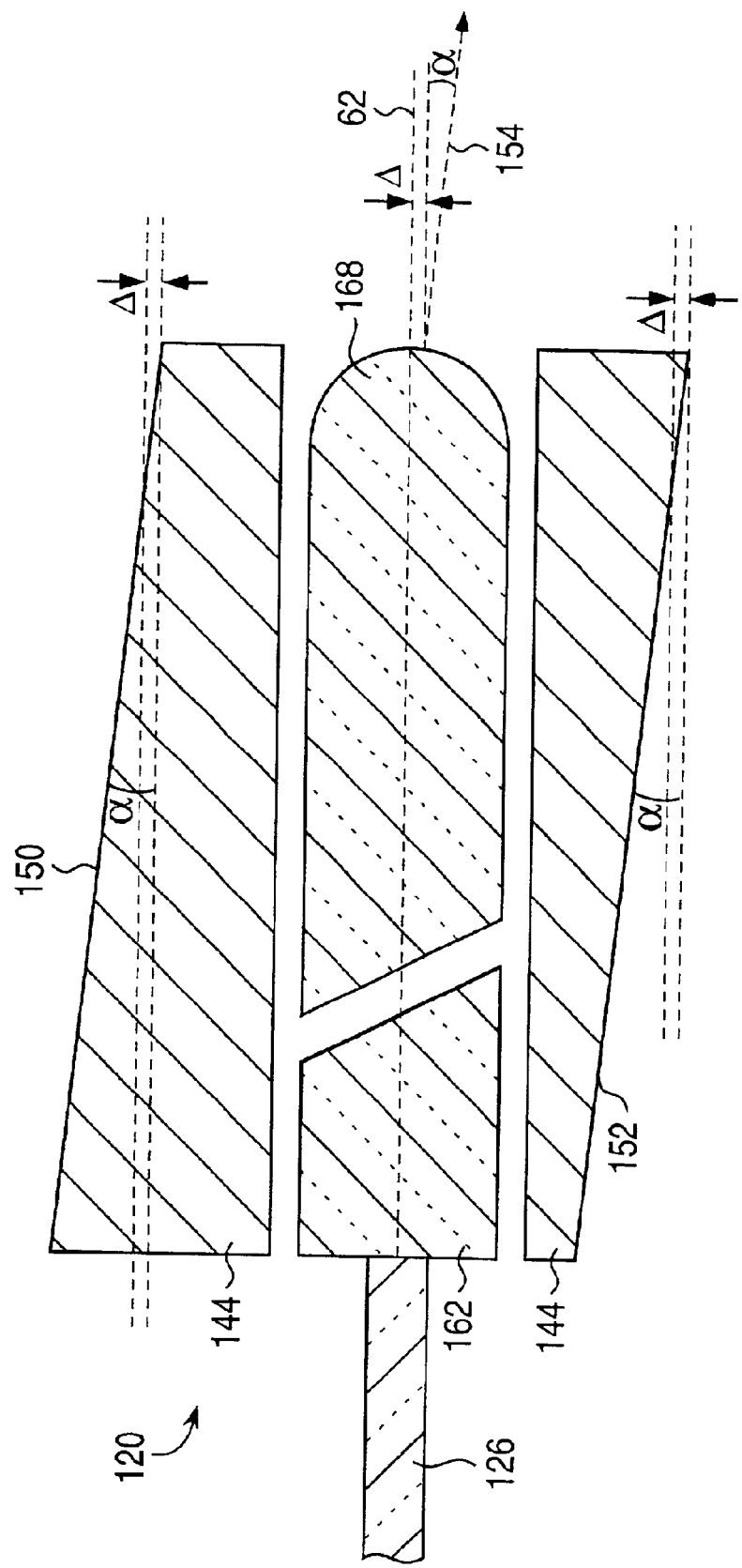
FIG. 15 is a side sectional view of a finished collimator product similar to FIG. 13, with a ball lens instead of a GRIN lens.

The side sectional view of FIG. 13 shows a finished collimator product with a GRIN lens 160 and a capillary 162 enclosed by the metal sleeve 144, which has an outer cylindrical surface 150, 152 that is concentric with the light beam emanating from the GRIN lens 160. FIG. 14 shows a side sectional view similar to FIG. 13, with a C lens 164 which has a curved outer surface 166 instead of the GRIN lens. FIG. 15 shows a side sectional view of a collimator similar to FIG. 13, with a hemispheric ball lens 168 instead of the GRIN lens. The principles of the present invention are applicable to various types of collimators to compensate for possible offsets or deviations of optical paths regardless of the particular type or construction of optical elements within the collimator.

Figure 16:
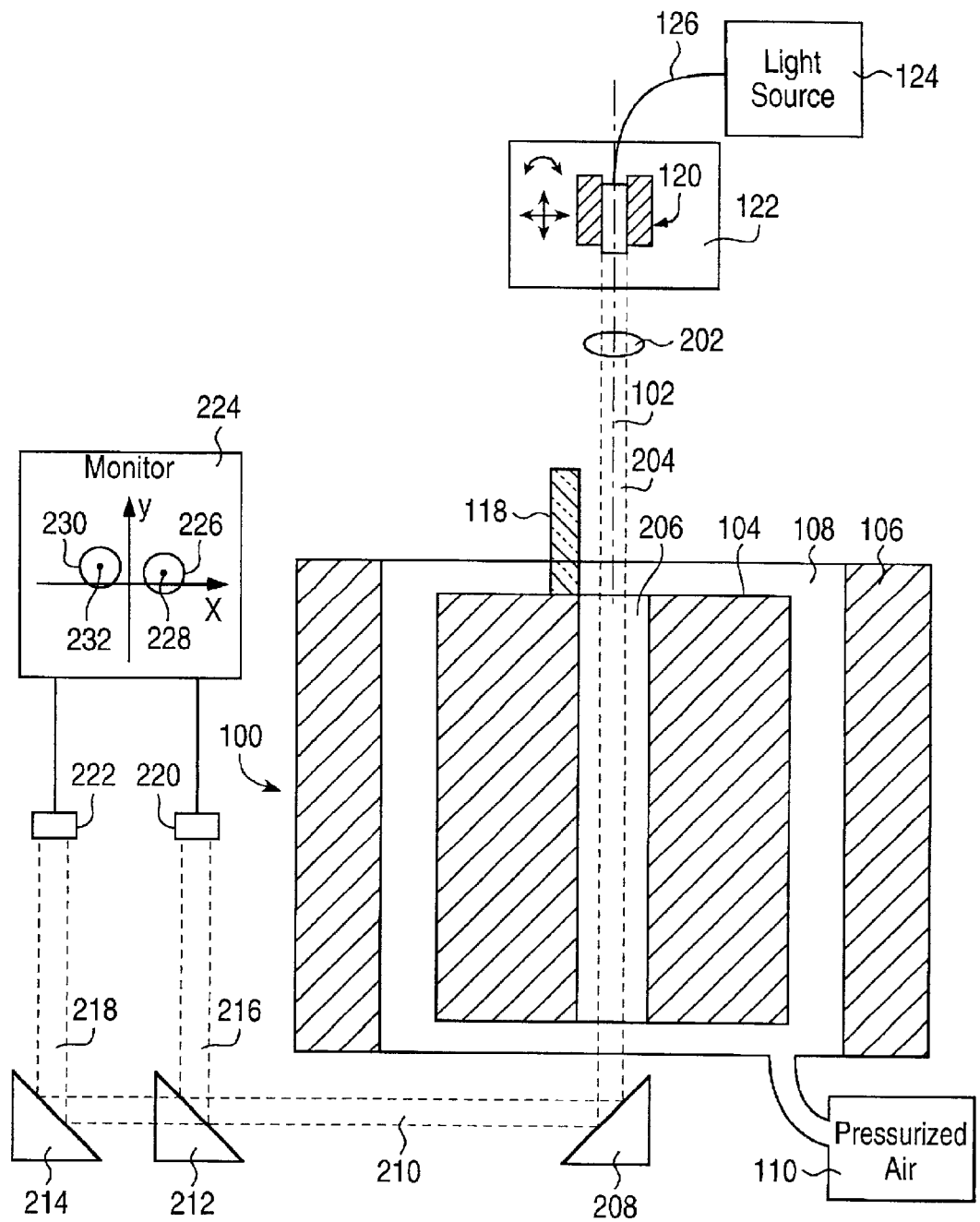
FIG. 16 shows another embodiment of the apparatus for determining the offset and the deviation of the light beam emanating from the collimator with three prisms and two charged coupled device (CCD) cameras.

FIG. 16 shows a preferred embodiment of the apparatus for determining the offset and deviation of the light beam emanating from the collimator, with two fixed CCD cameras for detecting the light spots instead of a single moving CCD camera as shown in FIG. 7 and described above. In the embodiment shown in FIG. 16, a focusing lens 202 is positioned along the output optical path 204 emanating from the collimator 120. In this embodiment, the rotating cylinder 104 of the air bearing 100 has a cylindrical hollow interior 206 to allow the light traveling along the output optical path 204 to pass through the air bearing 100.

In this embodiment, a total-reflection prism 208 is positioned to reflect the light beam that has traveled through the hollow interior 206 of the rotating cylinder 104 of the air bearing 100 onto a reflected optical path 210. As shown in FIG. 16, two additional prisms including a half-reflection prism 212 and a total-reflection prism 214 are positioned along the optical path 210 to reflect the output light beam onto separate optical paths 216 and 218, respectively. The prisms 208, 212 and 214 are fixed in position with respect to each other and with respect to the air bearing 100.

Two CCD cameras 220 and 222 are positioned to detect the light beams traveling along the reflected output optical paths 216 and 218, respectively. The CCD cameras 220 and 222 are fixed in space with respect to each other and with respect to the half-reflection prism 212 and the total-reflection prism 214. In this embodiment, the CCD cameras 220 and 222 are connected to a computer monitor 224 which displays the light spots sensed by the CCD cameras 220 and 222 on a Cartesian coordinate (x, y).

If the output optical path 204 emanating from the collimator 120 is perfectly aligned with the center axis 102 of the air bearing 100, the light spots detected by the two CCD cameras 220 and 222 would both be centered about the origin of the Cartesian coordinate. If the output optical path 204 has a translational offset with respect to the center axis 102 of the air bearing 100, the centers of the light spots detected by the CCD cameras 220 and 222 would be offset from the origin of the Cartesian coordinate. If an angular deviation exists in the output optical path 204 with respect to the center axis 102, the monitor 224 would show two separate light spots detected by the CCD cameras 220 and 222.

In FIG. 16, the computer monitor 224 shows a first light spot 226 with a first center 228 and a second light spot 230 with a second center 232 detected by the CCD cameras 220 and 222, indicating that both a translational offset and an angular deviation exist in the output optical path 204 with respect to the axis 102 of the air bearing 100. The positions of the centers 228 and 232 of the light spots 226 and 230 on the Cartesian coordinate (x, y) allow a computer to determine the appropriate adjustments that need be made to the position and orientation of the collimator 120 to align the output optical path 204 emanating from the collimator 120 with the center axis 102 of the air bearing 100.

In an embodiment, the support plate 122 that securely holds the collimator 120 can moved translationally and angularly with fine adjustments to align the optical path 204 with the axis 102 of the air bearing 100. Once the optical path 204 is aligned with the center axis 102 of the air bearing 100, the light spots detected by the CCD cameras 220 and 222 would overlap each other and would be centered about the origin of the Cartesian coordinate on the monitor 224.

The method according to embodiments of the present invention is not limited to the machining of collimators themselves. It is typical that an extra optical element may be added to the output of a collimator. Such an extra optical element may be an optical filter or an optical isolator, for example. A collimator assembly with an additional optical element may also be machined in a similar manner. In an embodiment, the extra optical element, such as a filter or an isolator, is fitted to the collimator to form a collimator assembly before the offset and deviation of the output optical path emanating from the collimator are measured. In this embodiment, the overall offset and deviation of the collimator assembly take into account any possible offset or deviation due to the extra optical element as well as the collimator lens. After the overall offset and deviation are measured, the sleeve of the collimator is machined to form the desired outer cylindrical surface.

FIG. 17 shows a collimator assembly similar to FIG. 13, but with an extra optical element 240 positioned adjacent the output of the lens 160 of the collimator. This extra optical element may be a filter, an isolator, or any other type of optical device. The sleeve 144 of the collimator assembly is machined to form the outer cylindrical surface 150, 152 in a similar manner to FIG. 13.

Although an embodiment of the collimator according to the present invention has been described above with particular reference to a manufacturing method and an apparatus including a rotating air bearing with a diamond knife for machining the sleeve of the collimator and a CCD camera with a computer display for optical alignment, the present invention is not limited to such an embodiment. Various other methods and apparatus may also be used in the manufacturing of collimators within the scope of the present invention as defined in the claims.

The present invention has been described with respect to particular embodiments thereof, and numerous modifications can be made which are within the scope of the invention as set forth in the claims.

What is claimed is:

1. A method of making a collimator having a lens centered about a collimator axis and enclosed by an outer sleeve, for precise alignment of an optical path emanating from the collimator to obviate need for adjusting the collimator to compensate for a translational offset or an angular deviation of the optical path with respect to the collimator axis, the method comprising the step of:

removing a portion of the outer sleeve according to the offset and the deviation, to form an outer cylindrical surface centered about an axis that coincides with the optical path.

2. The method of claim 1, wherein the step of removing the portion of the outer sleeve comprises the step of cutting the outer sleeve to form the outer cylindrical surface.

3. The method of claim 2, wherein the step of cutting the outer sleeve to form the outer cylindrical surface comprises the step of cutting the outer sleeve with a rotating cutter.

4. The method of claim 3, wherein the rotating cutter is attached to a bearing rotating about a stable bearing axis.

5. The method of claim 4, wherein the bearing comprises an air bearing.

6. The method of claim 4, further comprising the step of moving the collimator to align the optical path with the stable bearing axis.

7. The method of claim 6, wherein the collimator is held by an adjustable support, and wherein the step of moving the collimator comprises the step of moving the adjustable support.

8. The method of claim 7, further comprising the step of transmitting light through the collimator to provide a light spot along the optical path emanating from the collimator.

9. The method of claim 8, further comprising the steps of detecting the light spot at a first longitudinal position and recording a first center position of the light spot on a transverse planar coordinate.

10. The method off claim 9, further comprising the steps of detecting the light spot at a second longitudinal position and recording a second center position of the light spot on the transverse planar coordinate.

11. The method of claim 10, wherein the light spot is detected by a light sensor at the first and second longitudinal positions.

12. The method of claim 11, wherein the light sensor comprises a charge coupled device (CCD) camera.

13. The method of claim 12, further comprising the step of moving the CCD camera longitudinally to detect the light spot at the first and second longitudinal positions.

14. The method of claim 13, wherein the first and second center positions of the light spot are recorded by a computer.

15. The method of claim 10, wherein the transverse planar coordinate is a Cartesian coordinate having an x-axis and a y-axis intersecting at an origin, further comprising the step of setting the origin of the Cartesian coordinate at a given point along the stable bearing axis.

16. The method of claim 15, further comprising the step of computing a distance D between the first center position and the second center position of the light spot on the transverse planar coordinate.

17. The method of claim 16, wherein the first center position is at $(x_1, y_1)$ and the second center position is at $(x_2, y_2)$, and wherein the distance D between the first center position and the second center position of the light spot is computed according to a relationship:

$$D = \sqrt{(x_2-x_1)^2 + (y_2-y_1)^2}.$$

18. The method of claim 17, wherein the second longitudinal position is separated from the first longitudinal position by a longitudinal distance Z.

19. The method of claim 18, further comprising the step of computing the deviation $\alpha$ according to a relationship:

$$\alpha = \arctan \frac{D}{Z}.$$

20. The method of claim 1, further comprising the step of transmitting light through the collimator onto at least one reflector to produce two reflected output optical paths.

21. The method of claim 20, further comprising the step of detecting transverse planar positions of first and second light spots on the reflected output optical paths.

22. The method of claim 21, further comprising the step of determining the translational offset and the angular deviation based upon the transverse planar positions of the first and second light spots.

23. The method of claim 1, wherein the lens comprises a graded index (GRIN) lens.

24. The method of claim 1, wherein the lens comprises a C lens.

25. The method of claim 1; wherein the lens comprises a ball lens.

26. The method of claim 1, wherein the sleeve comprises a metal sleeve.

27. A method of making a collimator having a lens centered about a collimator axis and enclosed by an outer sleeve, for precise alignment of an optical path emanating from the collimator to obviate need for adjusting the collimator to compensate for a translational offset and an angular deviation of the optical path with respect to the collimator axis when the collimator is assembled to an optical device, the method comprising the steps of:

transmitting light through the collimator to provide a light spot along the optical path emanating from the collimator;

detecting the light spot at a first longitudinal position;

recording a first center position of the light spot on a transverse planar coordinate;

detecting the light spot at a second longitudinal position;

recording a second center position of the light spot on the transverse planar coordinate;

computing the offset and the deviation based upon the first and second longitudinal positions and the first and second center positions of the light spot; and removing a portion of the outer sleeve according to the offset and the deviation, to form an outer cylindrical surface that is concentric with the optical path.

28. The method of claim 27, wherein the step of removing the portion of the outer sleeve comprises the step of cutting the outer sleeve to form the outer cylindrical surface.

29. The method of claim 28, wherein the step of cutting the outer sleeve to form the outer cylindrical surface comprises the step of cutting the outer sleeve with a rotating cutter.

30. The method of claim 29, wherein the rotating cutter is attached to a bearing rotating about a stable bearing axis.

31. The method of claim 30, wherein the bearing comprises an air bearing.

32. The method of claim 31, further comprising the step of moving the collimator to align the optical path with the stable bearing axis.

33. The method of claim 32, wherein the collimator is held by an adjustable support, and wherein the step of moving the collimator comprises the step of moving the adjustable support.

34. The method of claim 27, wherein the light spot is detected by a light sensor at the first and second longitudinal positions.

35. The method of claim 34, wherein the light sensor comprises a charge coupled device (CCD) camera.

36. The method of claim 35, further comprising the step of moving the CCD camera longitudinally to detect the light goat at the first and second longitudinal positions.

37. The method of claim 27, wherein the first and second center positions of the light spot are recorded by a computer.

38. The method of claim 27, wherein the transverse planar coordinate is a Cartesian coordinate having an x-axis and a y-axis intersecting at an origin.

39. The method of claim 38, wherein the step of computing the offset and the deviation comprises the step of computing a distance D between the first center position and the second center position of the light spot on the transverse planar coordinate.

40. The method of claim 39, wherein the first center position is at $(x_1, y_1)$ and the second center position is at $(x_2, y_2)$, and wherein the distance D between the first center position and the second center position of the light spot is computed according to a relationship:

$$D=\sqrt{(x_2-x_1)^2+(y_2-y_1)^2}.$$

41. The method of claim 40, wherein the second longitudinal position is separated from the first longitudinal position by a longitudinal distance Z.

42. The method of claim 41, wherein the step of computing the offset and the deviation further comprises the step of computing the deviation a according to a relationship:

$$\alpha = \arctan\frac{D}{Z}.$$

43. The method of claim 27, wherein the lens comprises a graded index (GRIN) lens.

44. The method of claim 27, wherein the lens comprises a C lens.

45. The method of claim 27, wherein the lens comprises a ball lens.

46. The method of claim 27, wherein the sleeve comprises a metal sleeve.

* * * * *